(12) United States Patent
Iio et al.

(10) Patent No.: US 12,038,754 B2
(45) Date of Patent: Jul. 16, 2024

(54) MOVABLE BODY, MOVEMENT CONTROL SYSTEM, METHOD FOR CONTROLLING MOVABLE BODY, AND PROGRAM

(71) Applicant: MITSUBISHI HEAVY INDUSTRIES, LTD., Tokyo (JP)

(72) Inventors: Satoshi Iio, Tokyo (JP); Kiichi Sugimoto, Tokyo (JP); Kenta Nakao, Tokyo (JP); Kenji Takao, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 319 days.

(21) Appl. No.: 17/584,873

(22) Filed: Jan. 26, 2022

(65) Prior Publication Data
US 2022/0260997 A1  Aug. 18, 2022

(30) Foreign Application Priority Data

Feb. 16, 2021  (JP) .................................. 2021-022754

(51) Int. Cl.
*G05D 1/00*  (2024.01)
*B66F 9/06*  (2006.01)
(Continued)

(52) U.S. Cl.
CPC ........... *G05D 1/0214* (2013.01); *B66F 9/063* (2013.01); *B66F 9/0755* (2013.01);
(Continued)

(58) Field of Classification Search
CPC ............ G01C 21/3833; G01C 21/3859; G01C 21/3885; G01C 21/3889; G01C 21/3896;
(Continued)

(56) References Cited

U.S. PATENT DOCUMENTS 9,886,035 B1 * 2/2018 Watts .................. G05D 1/0276
10,976,749 B2   4/2021 Ando et al.
(Continued)

FOREIGN PATENT DOCUMENTS

| JP | 2011-248713 | 12/2011 |
| JP | 2018-120482 A | 8/2018 |
| WO | 2019/026761 A1 | 2/2019 |

OTHER PUBLICATIONS

Official Action issued Feb. 20, 2024 in corresponding Japanese patent application No. 2021-022754 with Machine English Translation, 6 pages.

*Primary Examiner* — Fadey S. Jabr
*Assistant Examiner* — Faris Asim Shaikh
(74) *Attorney, Agent, or Firm* — Wenderoth, Lind & Ponack, L.L.P.

(57) ABSTRACT

A movable body that moves automatically includes a plurality of sensors configured to detect an obstacle in a periphery of the movable body, a selection information acquisition unit configured to acquire selection information indicating a sensor, of the plurality of sensors, to be used for detection of the obstacle, the sensor being set based on a relationship between a reference position of the obstacle and a position of the movable body, and a detection control unit configured to cause the sensor indicated by the selection information to detect the obstacle, and identify a position of the obstacle from a detection result of the obstacle.

15 Claims, 11 Drawing Sheets

(51) Int. Cl.
*B66F 9/075* (2006.01)
*G01S 17/931* (2020.01)
*G06T 7/70* (2017.01)
*G06V 20/58* (2022.01)

(52) U.S. Cl.
CPC .............. *G01S 17/931* (2020.01); *G06T 7/70* (2017.01); *G06V 20/58* (2022.01); *G06T 2207/10028* (2013.01); *G06T 2207/30261* (2013.01)

(58) Field of Classification Search
CPC . G01C 1/00; G01C 3/00; G01C 21/38; G01C 21/3804; G01C 21/3807; G01C 21/3826; G01C 21/383; G01C 21/3848; A01D 78/001; A01D 78/1057; A01D 78/1071; A01D 84/00; B64C 39/024; B64U 10/13; B64U 2101/60; B64U 2201/10; B64U 30/20; B64U 50/19; G01B 11/00; G01B 11/002; G01B 11/02; G01B 11/08; G01B 11/14; G01B 11/24; G05D 3/00; G05D 2201/0216; G05D 1/0214; G05D 1/024; G05B 2219/49137; G05B 2219/40577; G05B 2219/40576; G05B 2219/40564; G05B 2219/40563; G05B 2219/40544; G05B 2219/40542; G05B 2219/40519; G05B 2219/40455; G06T 7/521; G06T 7/70; G06T 7/74; G06T 7/75; G06T 7/73; G06T 2207/10028; G06T 2207/30261; B25J 9/0003; G01S 17/42; G01S 17/87; G01S 17/003; G01S 7/4815; G01S 7/484; G01S 17/88; G01S 17/89; G01S 17/93; G01S 17/894; G01S 17/90; G01S 17/931; G01S 7/4811; G01S 17/00; G01S 17/04; G01S 17/06; G01S 17/50; G01S 17/58; G01S 7/4808; G06V 20/58; B66F 9/063; B66F 9/0755

See application file for complete search history.

(56) References Cited

U.S. PATENT DOCUMENTS

| | | | |
|---|---|---|---|
| 11,364,903 B2* | 6/2022 | Fan | G05D 1/024 |
| 2004/0090117 A1* | 5/2004 | Dudeck | B60W 10/18 303/193 |
| 2008/0046181 A1* | 2/2008 | Koike | G06V 20/58 701/301 |
| 2012/0053755 A1* | 3/2012 | Takagi | G01S 7/4808 701/1 |
| 2016/0356623 A1* | 12/2016 | Matsumoto | G01C 21/3461 |
| 2017/0116487 A1* | 4/2017 | Yamazaki | H04N 13/271 |
| 2018/0210455 A1 | 7/2018 | Ando et al. | |
| 2018/0253975 A1* | 9/2018 | Mizutani | G08G 1/167 |
| 2019/0033460 A1* | 1/2019 | Lipson | G01S 17/42 |
| 2019/0383941 A1* | 12/2019 | Siddiqui | G01S 17/89 |
| 2020/0074196 A1* | 3/2020 | Gui | G06T 7/70 |
| 2020/0142032 A1* | 5/2020 | Chen | G01S 17/931 |
| 2020/0183401 A1* | 6/2020 | Yang | G08G 1/166 |
| 2020/0239242 A1* | 7/2020 | Hoofard | G05D 1/0225 |
| 2020/0361376 A1* | 11/2020 | Umezane | G06V 20/586 |
| 2021/0003420 A1* | 1/2021 | Hamperl | G01C 21/3602 |
| 2021/0255272 A1* | 8/2021 | Chanal | G01S 3/043 |
| 2021/0373124 A1* | 12/2021 | Murakami | G01S 7/358 |
| 2022/0091603 A1* | 3/2022 | Kwon | G05D 1/0094 |
| 2022/0147059 A1* | 5/2022 | Borne-Pons | G06Q 10/0631 |

* cited by examiner

MOVABLE BODY, MOVEMENT CONTROL SYSTEM, METHOD FOR CONTROLLING MOVABLE BODY, AND PROGRAM

CROSS-REFERENCE TO RELATED APPLICATIONS

This application claims the benefit of priority to Japanese Patent Application Number 2021-022754 filed on Feb. 16, 2021. The entire contents of the above-identified application are hereby incorporated by reference.

TECHNICAL FIELD

The present disclosure relates to a movable body, a movement control system, a method for controlling a movable body, and a program.

RELATED ART

There is a known movable body that moves automatically and that is equipped with a sensor that detects the periphery. For example, JP 2011-248713 A describes an autonomous movable body that searches for a flat retreat wall surface having a predetermined length in plan view to avoid coming into contact with an impending obstacle.

SUMMARY

There is a need to appropriately detect any peripheral obstacle with the sensor because such a movable body has to move so as not to interfere with the peripheral obstacle or stop its movement if it interferes with the peripheral obstacle.

The present disclosure solves the above-described problem, and an object of the present disclosure is to provide a movable body, a movement control system, a method for controlling a movable body, and a program that can appropriately detect any peripheral obstacle using a sensor.

In order to solve the above-described problem and achieve the object, a movable body according to the present disclosure is a movable body that moves automatically, and includes a plurality of sensors configured to detect an obstacle in a periphery of the movable body, a selection information acquisition unit configured to acquire selection information indicating a sensor, of the plurality of sensors, to be used for detection of the obstacle, the sensor being set based on a relationship between a reference position of the obstacle and a position of the movable body, and a detection control unit configured to cause the sensor indicated by the selection information to detect the obstacle, and identify a position of the obstacle from a detection result of the obstacle.

In order to solve the above-described problem and achieve the object, a movement control system according to the present disclosure includes the movable body and an information processing device configured to transmit and receive information to and from the movable body.

In order to solve the above-described problem and achieve the object, a method for controlling a movable body according to the present disclosure is a method for controlling a movable body that moves automatically and that has a plurality of sensors configured to detect an obstacle in a periphery of the movable body, and the method includes a step of acquiring selection information indicating a sensor, of the plurality of sensors, to be used for detection of the obstacle, the sensor being set based on a relationship between a reference position of the obstacle and a position of the movable body, and a step of causing the sensor indicated by the selection information to detect the obstacle and identifying a position of the obstacle from a detection result of the obstacle.

In order to solve the above-described problem and achieve the object, a program according to the present disclosure is a program causing a computer to execute a method for controlling a movable body that moves automatically and that has a plurality of sensors configured to detect an obstacle in a periphery of the movable body, and the method includes a step of acquiring selection information indicating a sensor, of the plurality of sensors, to be used for detection of the obstacle, the sensor being set based on a relationship between a reference position of the obstacle and a position of the movable body, and a step of causing the sensor indicated by the selection information to detect the obstacle and identifying a position of the obstacle from a detection result of the obstacle.

According to the present disclosure, any obstacle on the periphery can be appropriately detected using the sensor.

BRIEF DESCRIPTION OF DRAWINGS

The disclosure will be described with reference to the accompanying drawings, wherein like numbers reference like elements.

DESCRIPTION OF EMBODIMENTS

Preferred embodiments of the present invention will be described in detail below with reference to the accompanying drawings. Note that the present invention is not limited to these embodiments, and, when there are a plurality of embodiments, the present invention is intended to include a configuration combining these embodiments.

First Embodiment

Overall Configuration of Movement Control System

Figure 1:
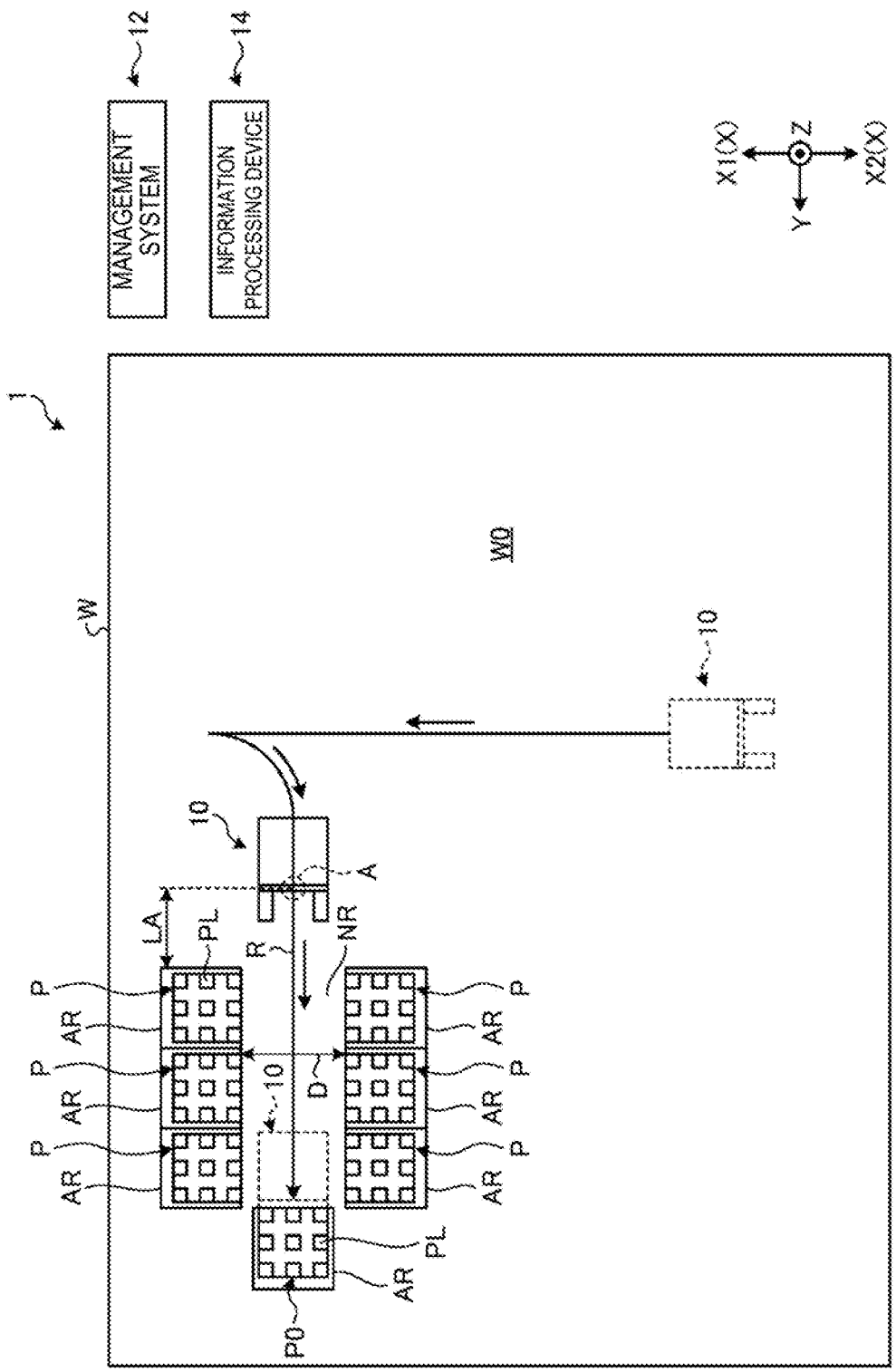
FIG. 1 is a schematic view of a movement control system according to a first embodiment.

FIG. 1 is a schematic view of a movement control system according to a first embodiment. As illustrated in FIG. 1, the movement control system 1 according to the first embodiment includes a movable body 10, a management system 12, and an information processing device 14. The movement control system 1 is a system that controls movement of the movable body 10 belonging to a facility W.

Configuration of Facility

The facility W is a facility that is logistically managed, such as a warehouse. The movement control system 1 causes the movable body 10 to move along a route R and pick up and convey a target object P0 disposed within a region W0 of the facility W. The region W0 is, for example, a floor surface of the facility W, and is a region where the target object P0 is placed and the movable body 10 moves. In the present embodiment, the target object P0 is a target object to be conveyed, the target object constituted by a load loaded on a pallet. The pallet of the target object P0 has a plurality of posts PL formed therein with an opening formed between the posts PL, through which a fork 24 (described below) of the movable body 10 is inserted. However, the target object P0 is not limited to an object constituted by a load loaded on a pallet, and may be only a load without a pallet, for example. Hereinafter, one direction along the region W0 is referred to as a direction X. and a direction along the region W0 that is orthogonal to the direction X is referred to as a direction Y. In the present embodiment, the direction Y is a direction orthogonal to the direction X. The direction X and the direction Y may be horizontal directions. A direction orthogonal to the directions X and Y, that is, the vertical direction, is referred to as a direction Z. In addition, one direction in the X direction is referred to as a direction X1, and the other direction in the direction X (the direction opposite the direction X1) is referred to as a direction X2.

In addition, an obstacle P is disposed in the region W0 of the facility W. In the present embodiment, the obstacle P is an object disposed on the side of a narrow path NR described below. In the present embodiment, the obstacle P is a load other than the target object P0 to be conveyed by the movable body 10, and, similar to the target object P0, is an object constituted by a load loaded on a pallet. However, the obstacle P is not limited to being an object constituted by a load loaded on a pallet, and may be only a load without a pallet, for example. For example, the obstacle P is not limited to being a load or a pallet, and may be any object that may change in position within the facility W, or any object that is present at a certain time but may not be present at another time. In other words, the obstacle P in the present embodiment is not a structure permanently fixed in position in the facility W.

A plurality of placement regions AR are provided in the region W0 in the facility W. The placement regions AR are regions where the target object P0 and obstacles P are placed. The placement regions AR is preset as regions where the target object P0 and the obstacles P are to be placed. The placement regions AR are divided by, for example, white lines, and the position (coordinates), shape, and size of the placement regions AR are preset. Since the target object P0 and the obstacles P are provided in respective placement regions AR, the position (coordinates) of the placement region AR where the target object P0 is provided is a reference position (reference coordinates) of the target object P0, and the position (coordinates) of a placement region AR where a corresponding obstacle P is provided is a reference position (reference coordinates) of the obstacle P. However, the reference position is the position of the target object P0 or the obstacle P in the case where the target object P0 or the obstacle P is assumed to be disposed at a prescribed position and attitude in the placement region AR, and the target object P0 or the obstacle P may not be disposed in the prescribed position and attitude. Accordingly, the reference position of the target object P0 or the obstacle P may be offset from the actual position of the target object P0 or the obstacle P, and can be considered to be the approximate position of the target object P0 or the obstacle P. Note that the term "position" refers to two-dimensional coordinates in the direction X and the direction Y in the region W0 of the facility W, and the term "attitude" refers to the orientation (rotation angle) of the movable body 10 when viewed from the direction Z orthogonal to the direction X and the direction Y. The terms position" and "attitude" in the description of the present embodiment are used in the same sense unless otherwise indicated.

Note that in the present embodiment, the placement region AR is provided in the region W0, which is the floor of the facility W; however, the placement region AR is not limited to this, and for example, may be provided in a load carrier of a vehicle that loads the target object P0 in the facility W. In addition, in the present embodiment, the placement region AR is defined for each target object P0 or obstacle P, and one of the target object P0 and the obstacle P is disposed in the placement region AR, but the present disclosure is not limited to this. For example, the placement region AR may be set as a free space where a plurality of target objects P0 or obstacles P are placed. In addition, in the example in FIG. 1, the placement region AR is rectangular, but may have any shape and size. Furthermore, any number of the placement regions AR may be provided in the region W0.

Narrow Path

In the present embodiment, the movable body 10 approaches the target object P0 through a narrow path NR. In other words, the movable body 10 moves along a route R through the narrow path NR to approach the target object P0. Here, the approximate position of the obstacle P is known because the reference position of the obstacle P is predetermined. However, for example, when passing through a narrow path such as the narrow path NR, even when the movable body moves so as to avoid the approximate position of an obstacle P, the movable body is more likely to interfere with the obstacle P due to misalignment with the actual obstacle P. Therefore, when passing through the narrow path NR, it is preferable to know the position of the obstacle P in more detail. In contrast, in the present embodiment, when passing through the narrow path NR, the movable body 10 performs a narrow path mode of selecting a sensor for detection of the obstacle P and detecting the position of the obstacle P to appropriately detect the position of the obstacle P. The narrow path mode will be described later.

The narrow path NR refers to a passage (space) that leads to the target object P0 and has a narrow width D. The length of the width D of the narrow path NR may be any length, but, for example, may be 1.2 times or less the width of the movable body 10. In the present embodiment, the width of the narrow path NR is defined by obstacles P disposed on both sides of the path. In other words, the narrow path NR is considered to be a passage that is sandwiched between an obstacle P disposed on one side and an obstacle P disposed on the other side and leads to the target object P0. Accordingly, the width D of the narrow path NR refers to a distance from the obstacle P disposed on one side to the obstacle P disposed on the other side. The narrow path NR is also considered to be a passage that is sandwiched between a placement region AR located on one side and a placement region AR located on the other side and leads to the target object P0. In this case, the width D of the narrow path NR refers to a distance from the placement region AR located on one side to the placement region AR located on the other side. Note that in the example in FIG. 1, the narrow path NR extends in the Y direction to the target object P0 and is sandwiched between obstacles P located on the X1 direction side (one side) and obstacles P located on the X2 direction side (the other side), but the narrow path NR in FIG. 1 is merely an example.

In this way, since there are the placement regions AR where the obstacles P are placed on both sides of the narrow path NR, the obstacles P, and the placement regions AR where the obstacle P is placed are considered to be near the route R passing through the narrow path NR, in other words, to fall within a predetermined distance range with respect to the route R passing through the narrow path NR. Thus, when moving along the route R passing through the narrow path NR, the movable body 10 is close to the obstacles P on both sides, increasing the risk of interference as described above. Note that the predetermined distance described herein may be any distance, but in the example in FIG. 1, is a half of the width D.

Note that in the present embodiment, an example is given in which the movable body 10 approaches the target object P0 through the narrow path NR and picks up the target object P0; however, the present embodiment is not limited to this, and the movable body 10 may unload a held target object after moving through the narrow path NR. In other words, the position of the target object P0 (or the placement region AR where the target object P0 is placed) illustrated in FIG. 1 and elsewhere is a destination of movement of the movable body 10, the target object P0 is present at the destination in the case of picking up, and the target object is unloaded at the destination in the case of unloading.

Movable Body

The movable body 10 is a device that automatically moves. In the present embodiment, the movable body 10 is a forklift, and, in particular, a so-called automated guided forklift (AGF). As illustrated in FIG. 1, the movable body 10 moves over the regions AR in the facility W. The movable body 10 approaches the target object P0 along the route R.

Figure 2:
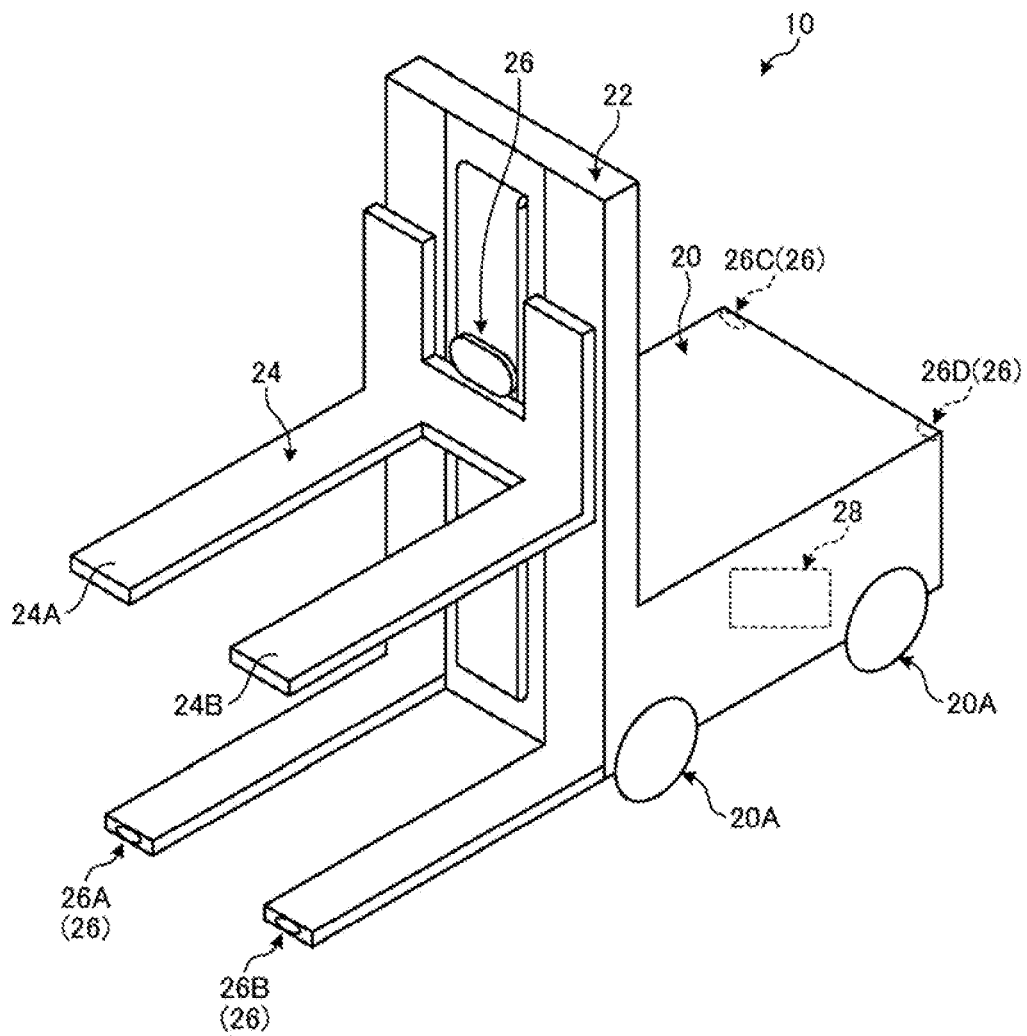
FIG. 2 is a schematic view of a configuration of a movable body.

FIG. 2 is a schematic view of a configuration of the movable body. As illustrated in FIG. 2, the movable body 10 includes a vehicle body 20, a mast 22, a fork 24, a plurality of sensors 26, and a control device 28. The vehicle body 20 has wheels 20A. The mast 22 is provided at one end of the vehicle body 20 in a front-back direction. The mast 22 extends along the vertical direction orthogonal to the front-back direction. The fork 24 is attached to the mast 22 so as to be movable in the direction Z. The fork 24 may be movable in a lateral direction of the vehicle body 20 (a direction intersecting with the vertical direction and the front-back direction) with respect to the mast 22. The fork 24 has a pair of tines 24A and 24B. The tines 24A and 24B extend, from the mast 22, toward the front direction of the vehicle body 20. The tines 24A and 24B are arranged separated from each other in the lateral direction of the mast 22. In the front-back direction, a direction to a side of the movable body 10 where the fork 24 is provided and a direction to a side where the fork 24 is not provided are respectively referred to as a front direction and a back direction.

The control device 28 controls movement of the movable body 10. The control device 28 will be described later.

Sensor

The sensors 26 detect at least one of the position and attitude of a target object in the periphery of the vehicle body 20. In other words, the sensors 26 may detect the position and attitude of the target object relative to the movable body 10. In the present embodiment, the sensors 26 are provided on the mast 22 and four corners of the vehicle body 20, that is, at left and right end portions on the front direction side and left and right end portions on the back direction side of the vehicle body 20. In other words, in the present embodiment, four sensors 26A, 26B, 26C, and 26D are provided as the sensors 26. The sensors 26A and 26B are provided on the tip of a support 25 that faces the fork 24, and the sensors 26C and 26D are provided on the back direction side of the vehicle body 20. However, the positions where the sensors 26 are provided in the movable body 10 (the positions of the sensors 26 in the coordinate system of the movable body 10) are not limited to these and may be any positions. Furthermore, the number of sensors 26 is not limited to four, and may be any number. For example, a safety sensor provided on the movable body 10 may also be applied as the sensor 26. With the safety sensor thus applied also for such a purpose, no new sensor needs to be provided. Note that the position of each of the sensors 26 in the coordinate system of the movable body 10 is known, and may be stored in a storage unit of the control device 28, for example.

The sensors 26 detect (receives) reflected light from a peripheral target object to detect the position and attitude of the target object. Each of the sensors 26 is a sensor that emits a laser beam. The sensor 26 detects the reflected light of the emitted laser beam to detect the position and attitude of the target object. The sensor 26 emits the laser beam while performing scanning in one direction, and detects the position and attitude of the target object from the reflected light of the emitted laser beam. In other words, the sensor 26 is a so-called 2D-light detection and ranging (LiDAR) sensor. In the present embodiment, the sensor 26 scans the laser beam in a horizontal direction, that is, in the direction Z. Note that the sensor 26 is not limited to the one described above and may be a sensor that detects the target object using any method, such as so-called 3D-LiDAR in which scanning is performed in multiple directions, or may be a camera.

Management System

Figure 3:
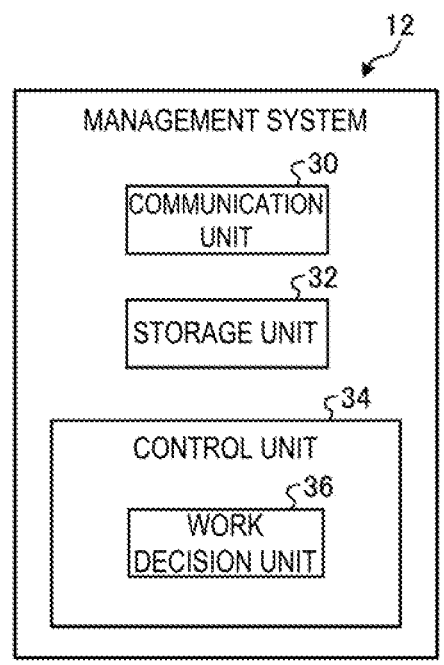
FIG. 3 is a schematic block diagram of a management system.

FIG. 3 is a schematic block diagram of the management system. The management system 12 is a system that manages physical distribution in the facility W. The management system 12 is a warehouse management system (WMS) in the present embodiment, but is not limited to WMS and may be any system, for example, a backend system such as any other production management system. The management system 12 may be provided at any position, and may be provided in the facility W or may be provided remote from the facility W to manage the facility W from a distant position. The management system 12 is a computer, and as illustrated in FIG. 3, includes a communication unit 30, a storage unit 32, and a control unit 34.

The communication unit 30 is a module used by the control unit 34 to communicate with an external device such as the information processing device 14, and may include, for example, an antenna or the like. The communication method of the communication unit 30 is wireless communication in the present embodiment, but any communication method may be used. The storage unit 32 is a memory that stores various information such as computation contents of the control unit 34 and programs, and includes, for example, at least one of a primary storage device such as a random access memory (RAM) or a read only memory (ROM), and an external storage device such as a hard disk drive (HDD). The control unit 34 is a computation device, that is, a central processing unit (CPU). The control unit 34 includes a work decision unit 36. The control unit 34 reads a program (software) from the storage unit 32 and executes it to implement the work decision unit 36 and perform its processing. Note that the control unit 34 may execute such processing with a single CPU, or may include a plurality of CPUs and execute the processing with the plurality of CPUs. The work decision unit 36 may be implemented by a hardware circuit. The program stored in the storage unit 32 for the control unit 34 may be stored in a recording medium that is readable from the management system 12.

The work decision unit 36 determines a target object P0 to be conveyed. Specifically, the work decision unit 36 determines work content indicating information of the target object P0 to be conveyed, for example, based on an input work plan. The work content is also considered to be information identifying the target object P0 to be conveyed. In the example of the present embodiment, the facility, the target object P0, a time limit, and a destination are determined as the work content. In other words, the work decision unit 36 is information indicating the target object P0 to be conveyed, the facility in which the target object P0 to be conveyed is stored, the destination of the target object P0, and a conveyance time of the target object P0. The work decision unit 36 transmits the determined work content to the information processing device 14 via the communication unit 30.

Information Processing Device

Figure 4:
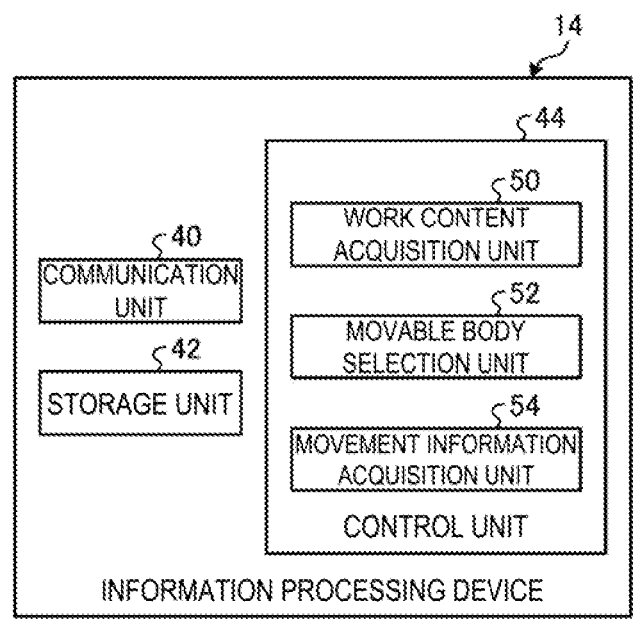
FIG. 4 is a schematic block diagram of an information processing device.

FIG. 4 is a schematic block diagram of the information processing device. The information processing device 14 is provided in the facility W, and is a device that transmits and receives information to and from the movable body 10, that is, a so-called ground system. The information processing device 14 is a computer, and as illustrated in FIG. 4, includes a communication unit 40, a storage unit 42, and a control unit 44. The communication unit 40 is a module used by the control unit 44 to communicate with an external device such as the management system 12 and the movable body 10, and may include, for example, an antenna or the like. The communication method of the communication unit 40 is wireless communication in the present embodiment, but any communication method may be used. The storage unit 42 is a memory for storing various information such as computation contents of the control unit 44 and programs, and includes, for example, at least one of a primary storage device such as a RAM or a ROM, and an external storage device such as an HDD.

The control unit 44 is a computation device, that is, a CPU. The control unit 44 includes a work content acquisition unit 50, a movable body selection unit 52, and a movement information acquisition unit 54. The control unit 44 reads and executes a program (software) from the storage unit 42 to implement the work content acquisition unit 50, the movable body selection unit 52, and the movement information acquisition unit 54, and executes the processing of those units. Note that the control unit 44 may execute such processing with a single CPU, or may include a plurality of CPUs and execute the processing with the plurality of CPUs. At least a part of the work content acquisition unit 50, the movable body selection unit 52, and the movement information acquisition unit 54 may be implemented by a hardware circuit. The program stored in the storage unit 42 for the control unit 44 may be stored in a recording medium that is readable from the information processing device 14.

Work Content Acquisition Unit and Movable Body Selection Unit

The work content acquisition unit 50 acquires information of the work content determined by the management system 12, that is, information of the target object P0 to be conveyed. The work content acquisition unit 50 identifies the placement region AR where the target object P0 is placed from the information of the target object P0 in the work content. For example, the target object P0 and the placement region AR where the target object P0 is placed are stored in the storage unit 42 in association with each other, and the work content acquisition unit 50 reads the information from the storage unit 42 to identify the placement region AR. The movable body selection unit 52 selects a target movable body 10. For example, the movable body selection unit 52 selects the target movable body 10 from among a plurality of movable bodies belonging to the facility W. The movable body selection unit 52 may select the target movable body 10 in any manner, and for example, may select the movable body 10 suitable for conveying the target object P0 in the placement region AR as the target movable body 10 based on the placement region AR identified by the work content acquisition unit 50.

Movement Information Acquisition Unit

The movement information acquisition unit 54 acquires movement information regarding the movement of the movable body 10. The movement information acquisition unit 54 acquires location information of the reference position of the obstacle P (here, the position of the placement region AR where the obstacle P is placed) as the movement information. The reference position of the obstacle P is preset. The movement information acquisition unit 54 acquires location information of the reference position of the obstacle P from the storage unit 42, for example.

The movement information acquisition unit 54 acquires, as the movement information, information of the route R to the placement region AR identified by the work content acquisition unit 50. The route R is preset for each placement region AR, for example. The movement information acquisition unit 54 acquires, for example, from the storage unit 42, information of the route R set for the placement region AR identified by the work content acquisition unit 50.

The route R is preset based on map information of the facility W. The map information of the facility W is information including location information about structures (fixtures such as posts and walls) installed in the facility W, reference positions of obstacles P (positions of the placement regions AR where the obstacles P are placed), a passage on which the movable body 10 can travel and the like, in other words, information indicating a region in the region AR, in which the movable body 10 can move. The route R may be set based on information of vehicle specifications of the movable body 10, in addition to the map information of the facility W. The information of the vehicle specifications is, for example, specifications affecting the route on which the movable body 10 can move, such as the size and the minimum turn radius of the movable body 10. When the route R is set based on the information of the vehicle specifications, the route R may be set for each movable body. Note that the route R may be set by a person based on the map information, the information of the vehicle specifications, and the like or may be automatically set by a device such as the information processing device 14 based on the map information, the information of the vehicle specifications, and the like. When the route R is automatically set, a desired point (waypoint) to be passed may be designated, for example. In this case, setting of the shortest route R that passes through the desired point while avoiding any structure is possible.

Note that the movement information acquisition unit 54 may set the route R without reading the preset route R. In this case, the movement information acquisition unit 54 may generate, as the route R, a path from the current position of the movable body 10 to the placement region AR of the target object P0, based on the location information of the target movable body 10, the location information of the placement region AR of the target object P0, and the map information of the facility W.

The information processing device 14 transmits to the target movable body 10 via the communication unit 40 the acquired movement information, that is, the location information of the reference position of the obstacle P and the information of the route R.

Control Device of Movable Body

Figure 5:
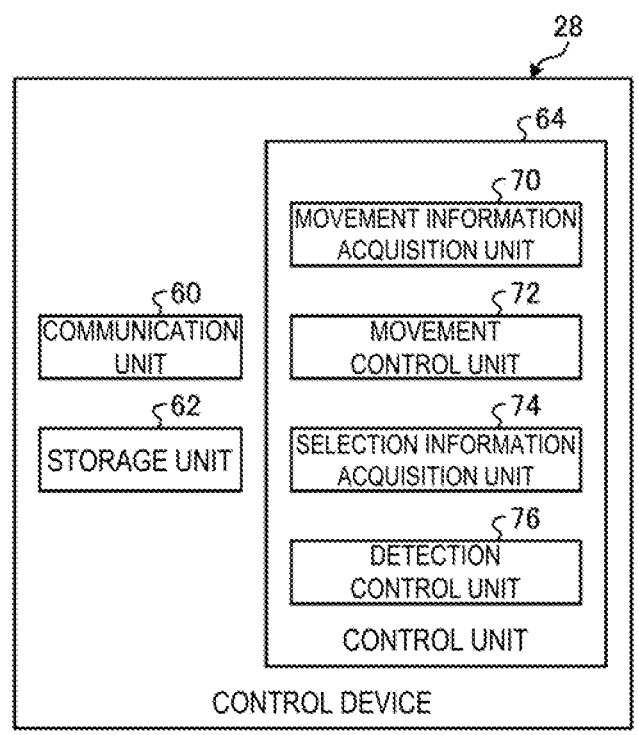
FIG. 5 is a schematic block diagram of a control device for the movable body.

Next, the control device 28 of the movable body 10 will be described. FIG. 5 is a schematic block diagram of the control device of the movable body. The control device 28 controls the movable body 10. The control device 28 causes the movable body 10 to move along the route R and pick up the target object P0. The control device 28 is a computer, and as illustrated in FIG. 5, includes a communication unit 60, a storage unit 62, and a control unit 64. The communication unit 60 is a module used by the control unit 64 to communicate with an external device such as the information processing device 14, and may include, for example, an antenna or the like. The communication method of the communication unit 40 is wireless communication in the present embodiment, but any communication method may be used. The storage unit 62 is a memory for storing various information such as computation content of the control unit 64 and programs, and includes, for example, at least one of a primary storage device such as a RAM or a ROM, and an external storage device such as an HDD.

The control unit 64 is a computation device, that is, a CPU. The control unit 64 includes a movement information acquisition unit 70, a movement control unit 72, a selection information acquisition unit 74, and a detection control unit 76. The control unit 64 reads a program (software) from the storage unit 62 and executes it to implement the movement information acquisition unit 70, the movement control unit 72, the selection information acquisition unit 74, and the detection control unit 76, and executes the processing of those units. Note that the control unit 64 may execute such processing with a single CPU, or may include a plurality of CPUs and execute the processing with the plurality of CPUs. At least a part of the movement information acquisition unit 70, the movement control unit 72, the selection information acquisition unit 74, and the detection control unit 76 may be implemented by a hardware circuit. Furthermore, the program stored in the storage unit 62 for the control unit 64 may be stored in a recording medium that is readable by the control device 28.

Movement Information Acquisition Unit

The movement information acquisition unit 70 acquires, via the communication unit 60, movement information, that is, location information of the reference position of the obstacle P and the route R, from the information processing device 14.

Movement Control Unit

The movement control unit 72 controls a movement mechanism such as a drive unit or steering device of the movable body 10 to control the movement of the movable body 10. The movement control unit 72 causes the movable body 10 to move along the route R acquired by the movement information acquisition unit 70. The movement control unit 72 causes the movable body 10 to move from the current position of the movable body 10 toward the target object P0 through the route R. The movement control unit 72 causes the movable body 10 to move through the route R by successively grasping the position and attitude of the movable body 10. The method for acquiring the position and attitude of the movable body 10 may be any method, and in the present embodiment, is simultaneous localization and mapping (SLAM). For example, the movement control unit 72 acquires the map information of the facility from the information processing device 14, and sequentially acquires the position and attitude of the movable body 10 based on the positional relationship between the position of a reference object in the map information and the position of the reference object detected by the sensor 26, i.e., using a map matching technique. However, the method for acquiring the position and attitude of the movable body 10 is not limited to this, and may be any method. The position and attitude of the movable body 10 may be acquired using, for example, a laser guidance principle. In this case, for example, a detection body (not illustrated) is provided in the facility W, and the movable body 10 irradiates the detection body with a laser beam, receives light of the laser beam reflected from the detection body, and detects the position and attitude of the movable body 10 in the facility W.

Selection Information Acquisition Unit

The selection information acquisition unit 74 acquires selection information indicating the sensor 26 used to detect the obstacle P. The selection information is set based on the relationship between the reference position of the obstacle P and the position of the movable body 10. In the present embodiment, the selection information acquisition unit 74 selects the sensor 26 used to detect the obstacle P based on the relationship between the reference position of the obstacle P and the position of the movable body 10 to set the selection information. Processing of the selection information acquisition unit 74 will be described later.

Detection Control Unit

The detection control unit 76 causes the sensor 26 indicated in the selection information to detect the obstacle P. and identify the position of the obstacle P from the detection result of the obstacle P by the sensor 26. Processing of the detection control unit 76 will be described below.

Processing of Control Device

Next, processing of the control device 28 performed when the movable body 10 is directed toward the target object P0 will be described. The movement information acquisition unit 70 of the control device 28 acquires information of the route R. In the present embodiment, as illustrated in the example in FIG. 1, the route R is a route through the narrow path NR toward the target object P0. The movement control unit 72 of the control device 28 causes the movable body 10 to move along the route R acquired by the movement information acquisition unit 70. Note that the route R to the target object P0 is preset as described above, but, for example, when the distance between the movable body 10 and the target object P0 approaches a predetermined range, the route R may be updated in accordance with the position of the target object P0. In this case, the control device 28 may cause the sensor 26 to detect the position and attitude of the target object P0, generate a more accurate route R toward the target object P0 based on the position and attitude of the target object P0, and switch the route R to the more accurate route R to approach the target object P0.

Switching from Normal Mode to Narrow Path Mode

The control device 28 controls the movable body 10 in a normal mode until the movable body 10 arrives at a switching position A, and switches to the narrow path mode when the movable body 10 arrives at the switching position A to control the movable body 10 in the narrow path mode. The normal mode is a control mode performed when the movable body moves away from the narrow path NR, and the narrow path mode is a control mode performed when the movable body moves near the narrow path NR or within the narrow path NR. In the normal mode, the control device 28 causes the movable body 10 to move along the route R without performing processing of selecting the sensor 26 for detecting the obstacle P. Processing in the narrow path mode will be described below.

The switching position A is preset. In the present embodiment, the movement information acquisition unit 70 acquires location information of the switching position A from the information processing device 14. The switching position A is set as a position on the route R and outside the region of the narrow path NR. The switching position A may be set at any position, but may be set, for example, at a position where a distance LA from the placement region AR closest to an entrance of the narrow path NR among the placement regions AR on the sides of the narrow path NR (the reference positions of the obstacles P) to the switching position A is a predetermined distance LX1 described below (for example, a distance at which the movable body 10 can safely stop) or more.

In this way, the control device 28 switches to the narrow path mode by using the arrival of the movable body 10 at the predetermined switching position A as a trigger, but the trigger to switch to the narrow path mode is not limited to this, and may be any trigger. For example, the control device 28 may determine whether to switch to the narrow path mode based on the positional relationship between the movable body 10 and the placement regions AR on the sides of the narrow path NR, and switches to the narrow path mode by using the determination to switch to the narrow path mode as a trigger. In this case, for example, the control device 28 may switch to the narrow path mode by using the condition that the distance from the movable body 10 to the placement region AR closest to the entrance of the narrow path NR has reached the below-mentioned predetermined distance LX1 or more, as a trigger.

Narrow Path Mode
Selection of Obstacle to be Detected

Figure 6:
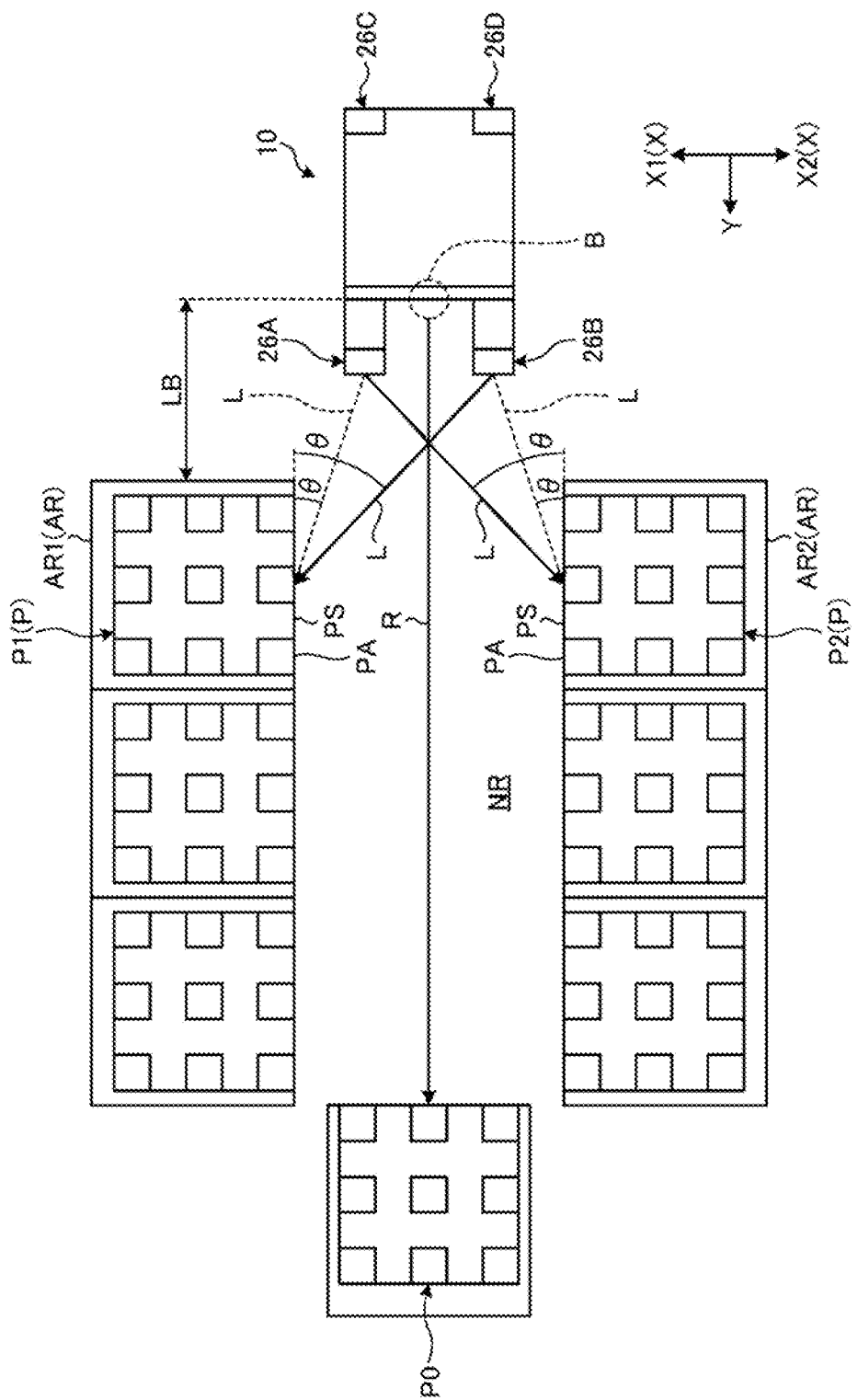
FIG. 6 is a schematic view for describing the processing of selecting a sensor to be used.

FIG. 6 is a schematic view for describing processing of selecting the sensor to be used. In the narrow path mode, the control device 28 causes the selection information acquisition unit 74 to select an obstacle P to be detected based on the relationship between the reference position of an obstacle P acquired by the movement information acquisition unit 70 (the position of the placement region AR), and the position of the movable body 10 detected by the movement control unit 72. The selection information acquisition unit 74 calculates the relationship between the reference position of each obstacle P and the position of the movable body 10, and selects an obstacle P as an obstacle to be detected when the relationship satisfies a predetermined condition. More specifically, as illustrated in FIG. 6, assuming that the distance between the reference position of an obstacle P and a current position B of the movable body 10 is a distance LB, the selection information acquisition unit 74 selects an obstacle P having the distance LB of the predetermined distance LX1 or more, in other words, an obstacle P placed in the placement region AR having the distance LB of the predetermined distance LX1 or more, as an obstacle to be detected. The predetermined distance LX1 may be any distance, and for example, may be a distance at which the movable body 10 can safely stop. The predetermined distance LX1 is calculated by, for example, Equation (1) below.

$$LX1 = L_{CVM} + L_{CAM} \quad (1)$$

Here. $L_{CVM}$ is a distance over which the movable body 10 moves at a constant speed until the brake is activated after sensing of the sensor 26, and is a value obtained by multiplying the speed of the movable body 10 moving at a constant speed (current movement speed) by the time elapsed until the brake is activated after sensing of the sensor 26. In addition. $L_{CAM}$ is a distance over which the movable body 10 moves at a constant acceleration until the movable body 10 stops after activation of the brake, and can be calculated by, for example, Equation (2) below. However, in Equation (2), $V_0$ is the speed of the movable body 10 moving at a constant-speed, and a is the deceleration caused by the brake.

$$L_{CAM} = 1.5 \times V_0^2 / a \quad (2)$$

Note that an upper limit of the distance LB capable of detecting the obstacle P is not particularly defined, and may be set based on, for example, the output of the laser beam, the reflectivity of the target object, sensor specifics such as the sensitivity of the sensor 26, and the like.

The selection information acquisition unit 74 selects the obstacle P to be detected as described above, but any method for selecting the obstacle P to be detected may be used. Note that, hereinafter, as illustrated in FIG. 6, a case will be described below in which an obstacle P1 in a placement region AR1 located on the X1 direction side of the narrow path NR and an obstacle P2 in a placement region AR2 located on the X2 direction side of the narrow path NR are to be detected. The reference position of the obstacle P1 is considered to lie on one side of the route R through the narrow path NR and within a predetermined distance range from the route R. and the reference position of the obstacle P2 is considered to lie on the other side of the route R through the narrow path NR and within a predetermined distance range from the route R.

Selection of Sensor

The selection information acquisition unit 74 selects the sensor 26 to be used for detection of the obstacle P to be detected based on the relationship between the reference position of the obstacle P to be detected (the position of the placement region AR to be detected) and the position of the movable body 10. The selection result of the sensor 26 used to detect the obstacle P to be detected is referred to as selection information. The selection information acquisition unit 74 selects the sensor 26 to be used for each of the obstacles P to be detected.

More specifically, the selection information acquisition unit 74 selects the sensor 26 to be used based on an angle of incidence θ of light emitted from the sensor 26 onto the obstacle P. The angle of incidence θ is calculated by the selection information acquisition unit 74 based on the reference position of the obstacle P and the position of the movable body 10 rather than the actual angle of incidence of the light emitted from the sensor 26. Specifically, the selection information acquisition unit 74 calculates the position of each sensor 26 (the position of the sensor 26 in the coordinate system of the facility W) based on the position of the movable body 10 and the position of the sensor 26 on the movable body 10. Then, the selection information acquisition unit 74 calculates the angle of incidence θ from the position of the sensor 26 and the reference position of the obstacle P. The selection information acquisition unit 74 may calculate, as the angle of incidence θ, an angle that a straight line (arrow L in the example in FIG. 6) connecting the position of the sensor 26 and the reference position of the obstacle P forms with a side PS on the narrow path NR side (the route R side) of the placement region AR of the obstacle P. The selection information acquisition unit 74 calculates the angle of incidence θ to the obstacle P for each of the sensors 26, and selects the sensor 26 to be used based on the respective angles of incidence θ. Specifically, the selection information acquisition unit 74 selects the sensor 26 having the largest angle of incidence θ among the plurality of sensors 26 provided in the movable body 10, as the sensor 26 to be used. In the example in FIG. 6, since the angle of incidence θ of the sensor 26B is large for the obstacle P1 located on the X1 direction side, the sensor 26B is selected for detection of the obstacle P1, and since the angle of incidence θ of the sensor 26A is large for the obstacle P2 located on the X2 direction side, the sensor 26A is selected for detection of the obstacle P2.

The selection information acquisition unit 74 selects the sensor 26 that detects an obstacle P to be detected as described above, but the method for selecting the sensor 26 is not limited to this, and any method may be used. For example, for each of the sensors 26, the selection information acquisition unit 74 may calculate the distance between the sensor 26 and the reference position of an obstacle P and select the sensor 26 for detecting the obstacle P based on the distance. In this case, for example, the selection information acquisition unit 74 may select the sensor 26 having the largest distance from the reference position of the obstacle P, as a sensor 26 for detecting the obstacle P.

Further, in the present embodiment, the selection information acquisition unit 74 selects the sensor 26 to be used to set the selection information, but the present disclosure is not limited to this. For example, the selection information acquisition unit 74 may acquire selection information set by an external device such as the information processing device 14. The method for setting the selection information by the information processing device 14 or the like in this case is the same as the method for setting by the selection information acquisition unit 74.

Detection of Position of Obstacle

Figure 7:
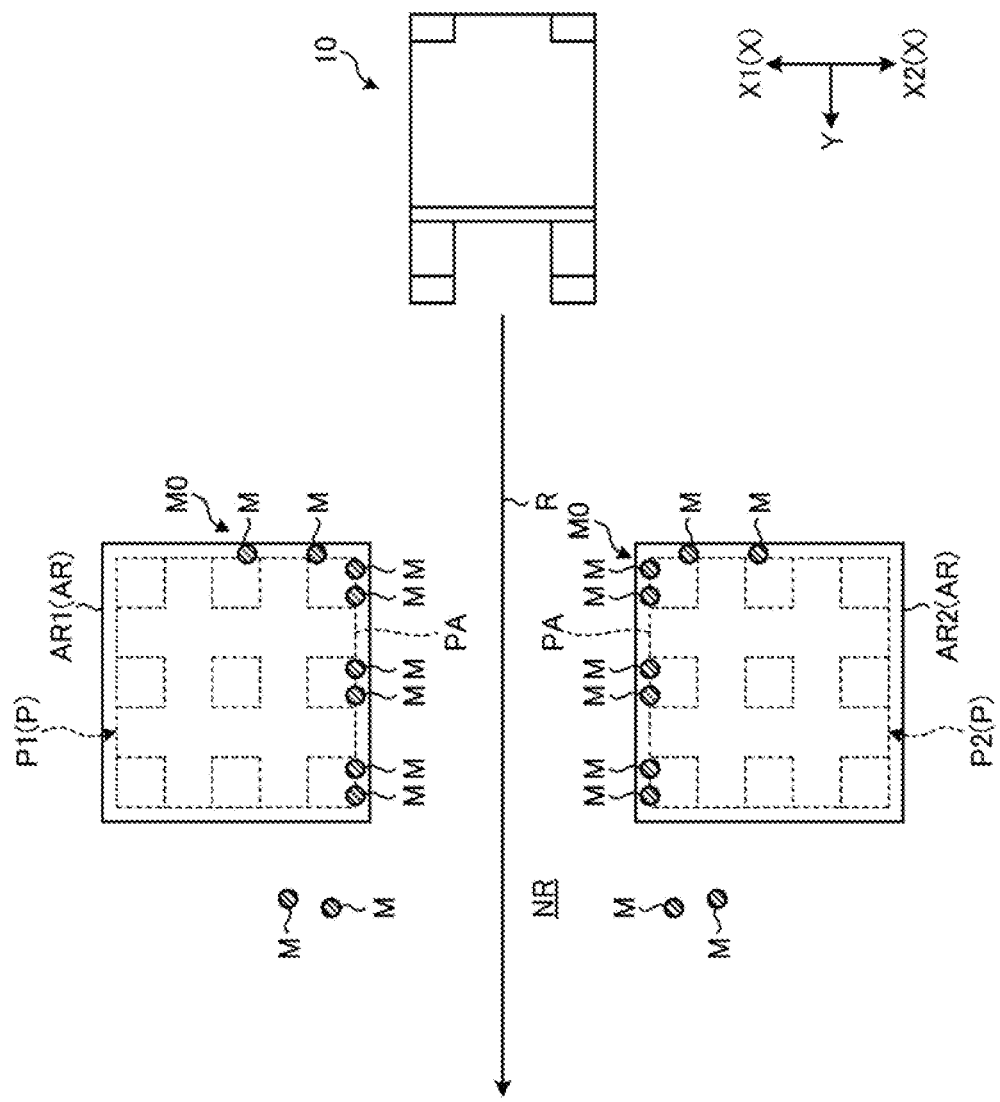
FIG. 7 is a schematic view for describing the detection of an obstacle.
Figure 8:
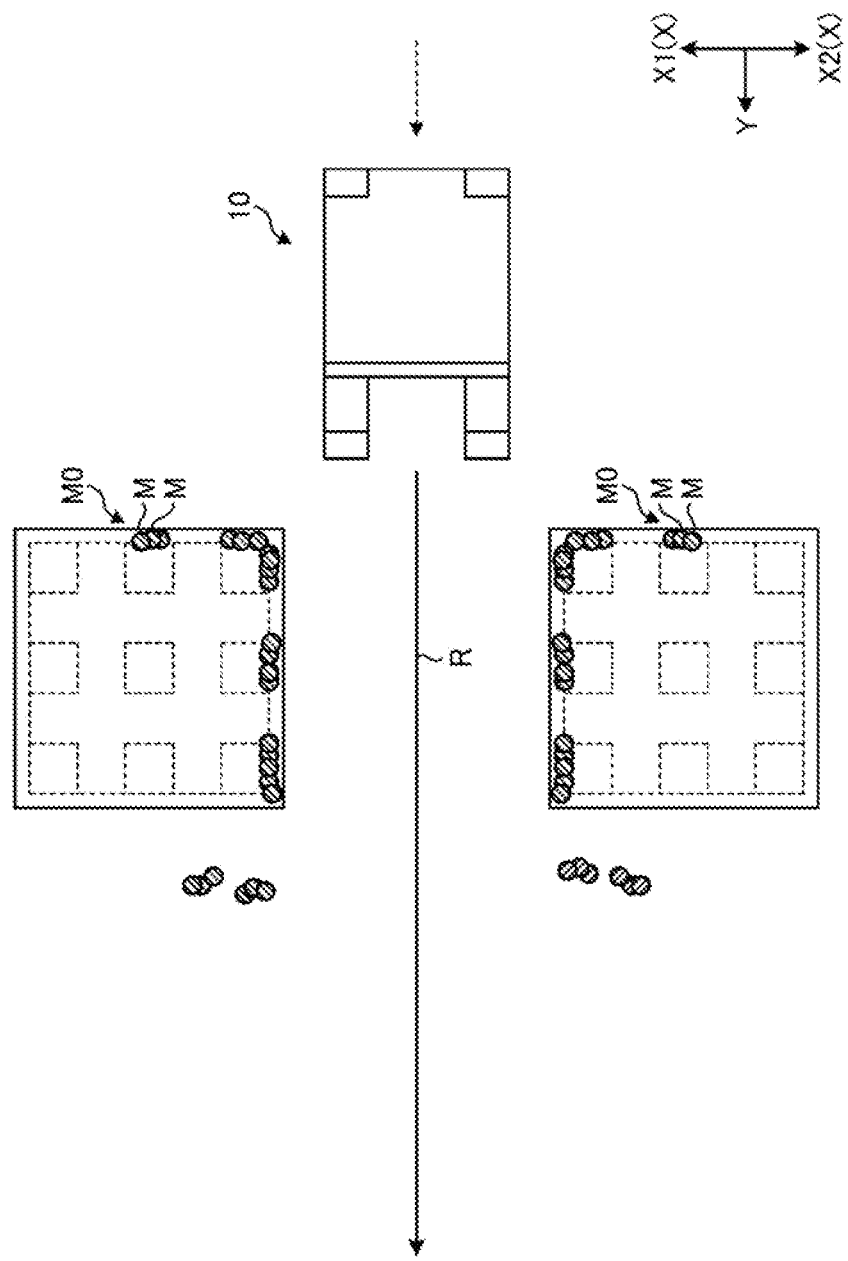
FIG. 8 is a schematic view for describing the detection of an obstacle.
Figure 9:
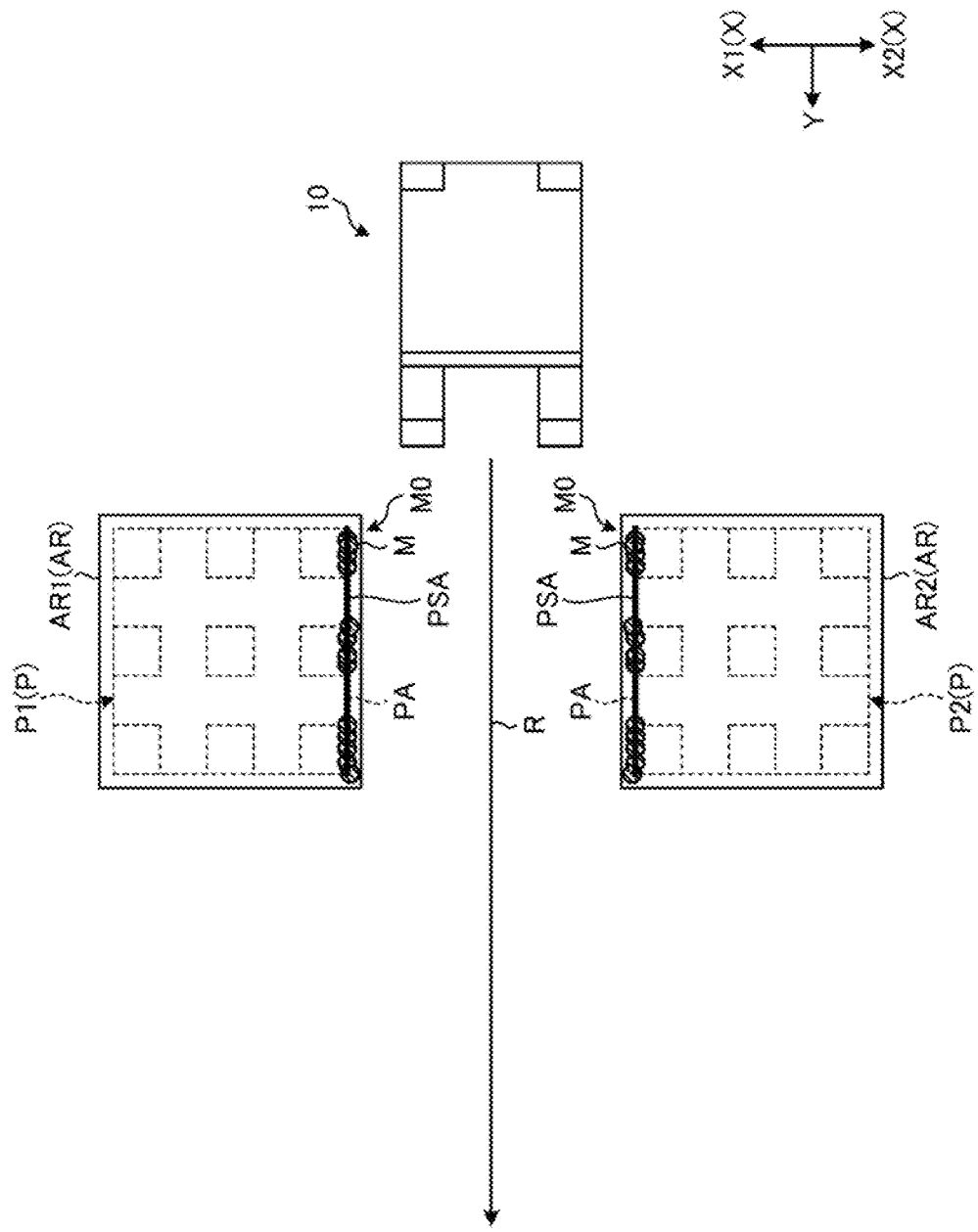
FIG. 9 is a schematic view for describing the detection of an obstacle.

FIGS. 7 to 9 are schematic views for describing the detection of obstacles. The detection control unit 76 causes the sensor 26 selected by the selection information acquisition unit 74 to detect the obstacle P, and identifies the position of the obstacle P from the detection result of the obstacle P by the sensor 26. More specifically, the detection control unit 76 causes the selected sensor 26 to irradiate the placement region AR to be detected with the laser beam. When the obstacle P is placed in the placement region AR, the laser beam is reflected from the obstacle P, and the sensor 26 receives the reflected light from the obstacle P. The detection control unit 76 acquires a point cloud M0, which is a collection of measurement points M, based on the reflected light received by the sensor 26, and identifies the position of a surface PA of an obstacle P on a side facing the route R through the narrow path NR as the position of the obstacle P, based on the point cloud M0. The position of the surface PA may refer to, for example, a set of coordinates for positions along the surface PA. Note that, as illustrated in FIG. 7, each of the measurement points M indicates a position (coordinates) at which the reflected light is reflected. That is, the measurement point M is a point indicating a position at which the laser beam is reflected, and the point cloud M0 refers to a collection of points each indicating a position at which the laser beam is reflected. In addition, in the present embodiment, the detection control unit 76 identifies the position of the surface PA of the obstacle P, but the present disclosure is not limited to this. The detection control unit 76 may identify a position other than the surface PA of the obstacle P.

In the present embodiment, the control device 28 selects the sensor 26 to be used while moving the movable body 10 along the route R, and causes the selected sensor 26 to detect the position of the obstacle P. Accordingly, as illustrated in FIG. 8, the detection control unit 76 causes the sensor 26 to irradiate the same placement region AR with a laser beam in a plurality of scans to detect the same obstacle P multiple times. The detection control unit 76 acquires the point cloud M0 from the reflected light of the laser beam in each scan, and superimposes the point clouds M0 acquired by multiple detections. The detection control unit 76 may superimpose the point clouds M0 acquired in a predetermined number of most recent scans. Note that the control device 28 is not limited to causing the sensor 26 to perform scanning while moving the movable body 10, and may cause the sensor to perform scanning multiple times in a stopped state, or may cause the movable body to stop every time the movable body moves a predetermined distance and perform scanning.

The detection control unit 76 extracts measurement points M used to identify the position of the surface PA from the measurement points M included in the superimposed point clouds M0. The detection control unit 76 extracts measurement points M corresponding to the reflected light from the surface PA based on the reference position of the obstacle P to be detected. For example, the detection control unit 76 extracts measurement points M within a predetermined distance range from the reference position of the obstacle P as measurement points M used to identify the position of the surface PA. The detection control unit 76 may extract measurement point M based on a measurement error of the position of the measurement points M in addition to the reference position of the obstacle P to be detected. In this case, for example, the distance range is widened by the measurement error, and measurement points M within the predetermined distance range from the reference position of the obstacle P are extracted. Alternatively, for example, the detection control unit 76 may exclude measurement points M at a position estimated to be the position of the opening of the obstacle P (the opening between the posts PL of the pallet) to extract measurement points M estimated to be a position other than the opening. The position of the opening of the obstacle P may be estimated based on design information of the obstacle P.

After extracting the measurement points M, the detection control unit 76 calculates the position of the surface PA of the obstacle P based on the point cloud M0, which is a collection of the extracted measurement points M, as illustrated in FIG. 8. The detection control unit 76 performs line segment fitting on the extracted point cloud M0 to calculate a straight line PSA and identifies the straight line PSA as the surface PA of the obstacle P. The line segment fitting may be performed in any manner, and for example, an approximate straight line of the extracted point cloud M0 may be calculated as the straight line PSA.

The detection control unit 76 identifies the position of the surface PA of the obstacle P as described above. Note that, in the description described above, the process of superimposing point clouds M0 acquired by respective scans is performed, thereby improving the calculation accuracy of the position of the surface PA of the obstacle P. However, this superimposition process is not required, and for example, the position of the surface PA may be identified from a point cloud M0 acquired by a single scan. In addition, the method for extracting measurement points M used to identify the position of the surface PA is not limited to the above-mentioned method and may be performed in any manner, and the extraction processing itself is not required.

The detection control unit 76 may transmit to the information processing device 14 information of the identified position of the obstacle P. In this case, the movement information acquisition unit 54 of the information processing device 14 acquires the information of the position of the obstacle P identified by the detection control unit 76, and sets the position of the obstacle P identified by the detection control unit 76 as the reference position of the obstacle P to update the reference position of the obstacle P. This can reduce an error between the reference position of the obstacle P and the actual position of the obstacle P to enable subsequent setting of the route R to be performed with high accuracy and subsequent movement in the narrow path NR to be performed at a higher speed. Further, for example, when the position of the movable body 10 is estimated by using the reference position of the obstacle P in map matching, the position of the movable body 10 can be estimated with higher accuracy. Note that when the position of the obstacle P identified by the detection control unit 76 is defined as the reference position of the obstacle P, the obstacle P is preferably not moved. That is, when the position of the obstacle P has not moved after the identification of the obstacle P, the reference position of the obstacle P is preferably updated to be the position of the obstacle P identified by the detection control unit 76.

Determination of Interference

Next, based on the position of the obstacle P identified by the detection control unit 76, the movement information acquisition unit 70 determines whether the movable body 10 interferes with the obstacle P if the movable body 10 continues to move along the route R. For example, the movement information acquisition unit 70 calculates a locus of the movable body 10 from the location information of the route R and the design information of the movable body 10, and determines that the movable body 10 interferes with the obstacle P if the locus overlaps with the obstacle P, the position of which has been identified. On the other hand, the movement information acquisition unit 70 determines that the movable body 10 does not interfere with the obstacle P when the locus of the movable body 10 does not overlap the obstacle P. However, the determination criteria for interference are not limited to this. For example, in the case where the target object P0 conveyed by the movable body 10 is larger than the width of the movable body 10, the movement information acquisition unit 70 may define the locus of the target object P0 as the locus of the movable body 10, and determine that the movable body 10 interferes with the obstacle P when the locus overlaps the position of the obstacle P. Also, for example, an error may be taken into consideration, and when a distance between the locus of the movable body 10 and the position of the obstacle P falls within a distance range, the movement information acquisition unit may determine that the movable body 10 interferes with the obstacle P.

Interference

When it is determined that the movable body 10 interferes with the obstacle P, the movement information acquisition unit 70 determines whether setting of another route R that does not interfere with the obstacle P is possible. The determination of whether setting of another route R is possible may optionally be made, and for example, when the positions of the obstacles P located on both sides of the route R through the narrow path NR are detected (that is, there are obstacles P on both sides) and the distance between the surfaces PA of the obstacles P located on both sides is larger than a predetermined length, it may be determined that setting of another route R is possible. On the contrary, when the distance between the surfaces PA of the obstacles P located on both sides is the predetermined length or less, it may be determined that the setting of another route R is not possible. The predetermined length described herein may be, for example, the width of the movable body 10 or the width of the target object P0.

In the case where setting of another route R that does not interfere with the obstacle P is possible, the movement information acquisition unit 70 generates a route R that does not interfere with the obstacle P, and the movement control unit 72 switches to the generated route R, and causes the movable body 10 to move along the generated route R.

On the contrary, in the case where setting of another route R that does not interfere with the obstacle P is not possible, the movement control unit 72 stops the movement of the movable body 10. Further, the movement control unit 72 may cause an emergency stop of the movable body 10 when the distance between the movable body 10 and the obstacle P is the predetermined distance LX1 or less, and may normally stop the movable body 10 when the distance between the movable body 10 and the obstacle P is larger than the predetermined distance LX1. An emergency stop is a control that increases deceleration more than in the case of a normal stop. Note that the determination of whether setting of another route R is possible or the generation of another route R need not be performed by the movement information acquisition unit 70, and another device such as the information processing device 14 may perform such processing and the movement information acquisition unit 70 may acquire the determination result and information about another route R.

In the case where setting of another route R that does not interfere with the obstacle P is not possible, the control device 28 may transmit to the information processing device 14 information indicating that the movable body 10 cannot move due to interference with the obstacle P. When receiving this information, the information processing device 14 may generate a command to move the obstacle P that is causing interference, and output the command to the movable body 10 or another movable body. In this case, since the movable body receiving the command moves the obstacle P that is causing interference, the movable body 10 can move toward the target object P0 without any interference. The destination of the obstacle P causing interference may be a position causing no interference in the same placement region AR, or may be another location. In addition, in the case where there are a plurality of obstacles P causing interference, the information processing device 14 preferably generates a command to preferentially move obstacles P having a large deviation with respect to the reference position.

No Interference

On the contrary, when it is determined that the movable body 10 does not interfere with an obstacle P, the movement control unit 72 continues to use the route R to continuously move the movable body 10 along the route R. However, even when the movable body 10 does not interfere with an obstacle P, the movement information acquisition unit 70 may set another route R, and the movement control unit 72 may switch to the set route R. For example, the movement information acquisition unit 70 may set a route R passing through the center of the obstacles P located on both sides of the narrow path NR as the other route R.

Processing Flow of Control Device

Figure 10:
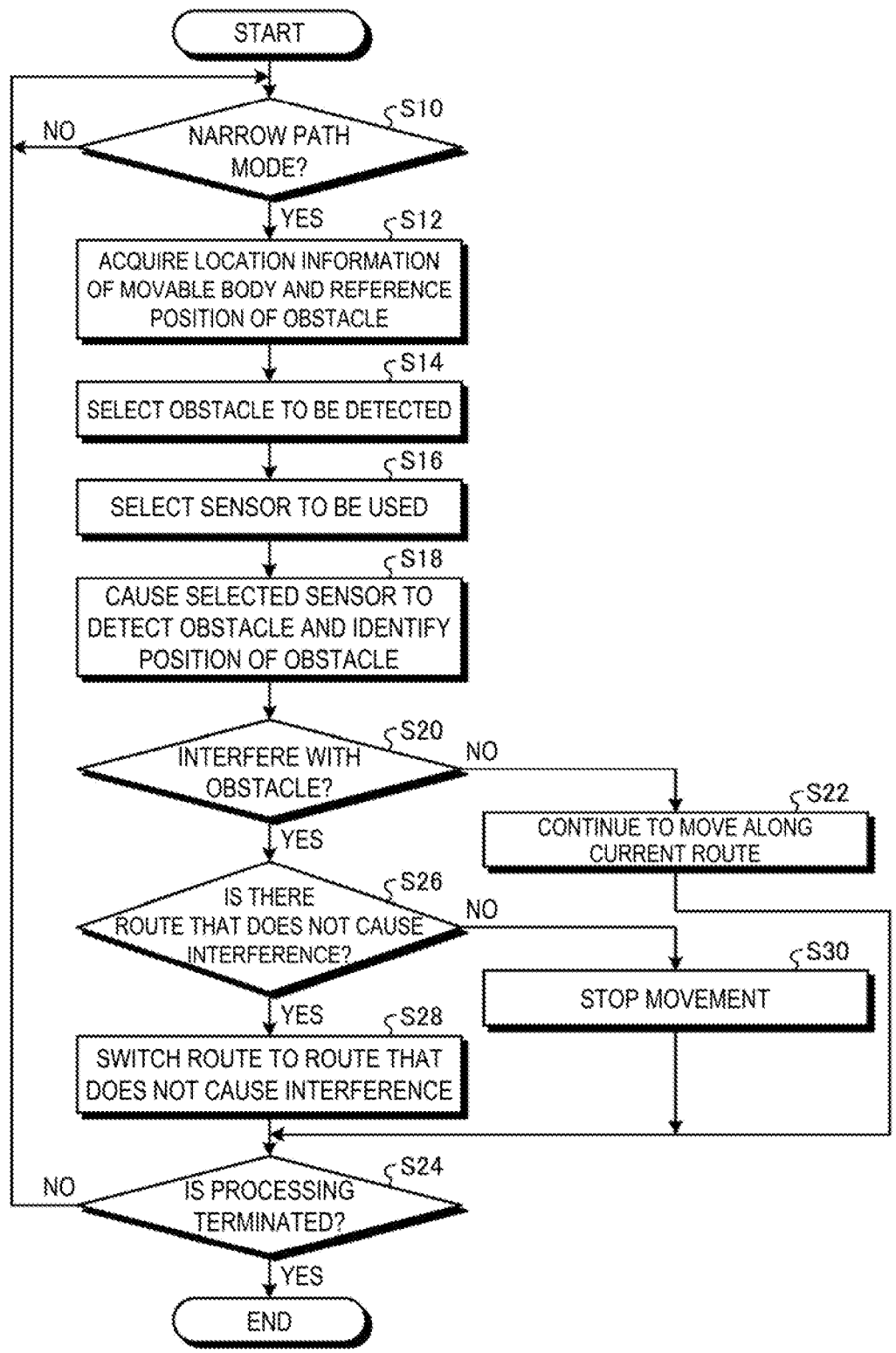
FIG. 10 is a flowchart for describing a processing flow of the control device.

The flow of the above-described processing of the control device 28 will be described with reference to a flowchart. FIG. 10 is a flowchart illustrating a processing flow of the control device. As illustrated in FIG. 10, in the narrow path mode (step S10: Yes), the control device 28 acquires information of the position of the movable body 10 and information of the reference positions of obstacles P (step S12). The control device 28 causes the selection information acquisition unit 74 to select an obstacle P to be detected based on the position of the movable body 10 and the reference position of the obstacle P (step S14), and selects the sensor 26 to be used for detection of the obstacle P to be detected (step S16). The detection control unit 76 of the control device 28 causes the selected sensor 26 to detect the obstacle P to be detected and identify the position of the obstacle P (step S18). In the present embodiment, the detection control unit 76 acquires a point cloud M0 from the detection result of the sensor 26, and calculates the position of the obstacle P based on the point cloud M0. Then, the control device 28 determines whether the movable body 10 interferes with the obstacle P in the case where the movable body 10 is moved along a route R, based on the identified position of the obstacle P (step S20). When it is determined that there is no interference (step S20; No), the control device 28 causes the movement control unit 72 to continue the movement along the route R (step S22). When the processing is not terminated (step S24; No), the processing returns to step S10, and in the case of the narrow path mode, selection of an obstacle P to be detected, selection of the sensor 26, and determination of interference are repeated. On the contrary, when it is determined that there is interference (step S20; Yes), the control device 28 determines whether there is another route R that does not interfere with the obstacle P (step S26). When there is another route R that does not interfere with the obstacle P (step S26; Yes), the control device 28 causes the movement control unit 72 to switch to the route R that does not interfere with the obstacle P and move the movable body 10 along the route R (step S28). On the contrary, when there is no other route R that does not interfere with the obstacle P (step S26: No), the control device 28 causes the movement control unit 72 to stop the movement of the movable body 10 (step S30). After performing the step S28 or the step S30, the processing proceeds to step S24, and when the processing is not terminated (step S24; No), the process returns to step S10, and in the case of the narrow path mode, selection of an obstacle P to be detected, selection of the sensor 26, and determination of interference are repeated. Note that when the processing is terminated in step S24 (step S24; Yes), the processing is terminated.

Effect

As described above, the movable body 10 according to the present embodiment selects the sensor 26 used to detect an obstacle P from the positional relationship between the reference position of the obstacle P and the position of the movable body 10. Accordingly, according to the present embodiment, the sensor 26 suitable for detection can be used to appropriately detect the obstacle P. In particular, when moving through the narrow path NR, the moving body preferably detects an obstacle P located beyond a safely stoppable distance so as not to collide with the obstacle P. However, in the case of detecting such a distant obstacle P, the angle of incidence of the laser beam to the obstacle P may become small depending on the position of the sensor 26. When the angle of incidence becomes small, the apparent length of the obstacle P when the obstacle P is viewed from the sensor 26 becomes short, decreasing the density of the point cloud M0 and the amount of reflected light, and thus possibly lowering the measurement accuracy. In contrast, the movable body 10 according to the present embodiment selects the sensor 26 with a large angle of incidence θ for measurement, appropriately suppressing a decrease in the measurement accuracy.

Note that in the present embodiment, the sensor 26 is selected for an obstacle P having a reference position located on a side of the narrow path NR, and the obstacle P is detected using the sensor 26. However, the target obstacle P is not limited to an obstacle located on a side of the narrow path NR. The control device 28 may select the sensor 26 to detect an obstacle P at any position in a similar manner to that described above. However, in this manner, the target obstacle P may be any obstacle, but is preferably an obstacle P having a reference position away from the movable body 10 by the predetermined distance LX1 or more.

Furthermore, the movement control system 1 according to the present embodiment is used for the logistically managed facility W, but is not limited to a logistically managed facility and may be used in any application.

Second Embodiment

Next, a second embodiment will be described. The second embodiment differs from the first embodiment in that, in accordance with the reliability of the position of the obstacle P calculated by the detection control unit 76, the reference position is updated using the calculated position of the obstacle P. In the second embodiment, the description of parts having the same configuration as those in the first embodiment will be omitted.

In the second embodiment, the detection control unit 76 of the movable body 10 calculates the reliability with respect to the accuracy of the position of the identified obstacle P. The reliability refers to the degree of error between the position of the obstacle P identified by the detection control unit 76 and the actual position of the obstacle P, and the higher the reliability, the more likely it is that the error will be small. As described above, the detection control unit 76 performs line segment fitting on the point cloud M0 to calculate the straight line PSA and sets the straight line PSA as the position of the obstacle P. Therefore, in the second embodiment, the detection control unit 76 calculates the reliability of the straight line PSA as the reliability of the position of the obstacle P.

Although any method for calculating the reliability may be used, for example, the detection control unit 76 may calculate the reliability of the straight line PSA based on the angle of incidence of the laser beam emitted from the sensor 26 to the obstacle P. In this case, the detection control unit 76 preferably sets the reliability to be higher as the angle of incidence becomes larger. Note that the angle of incidence described herein is the angle of incidence θ calculated based on the reference position of the obstacle P and the position of the movable body 10, but the angle of incidence is not limited to this, and the actually measured value of the angle of incidence of the laser beam emitted from the sensor 26 to the obstacle P may be used.

Figure 11:
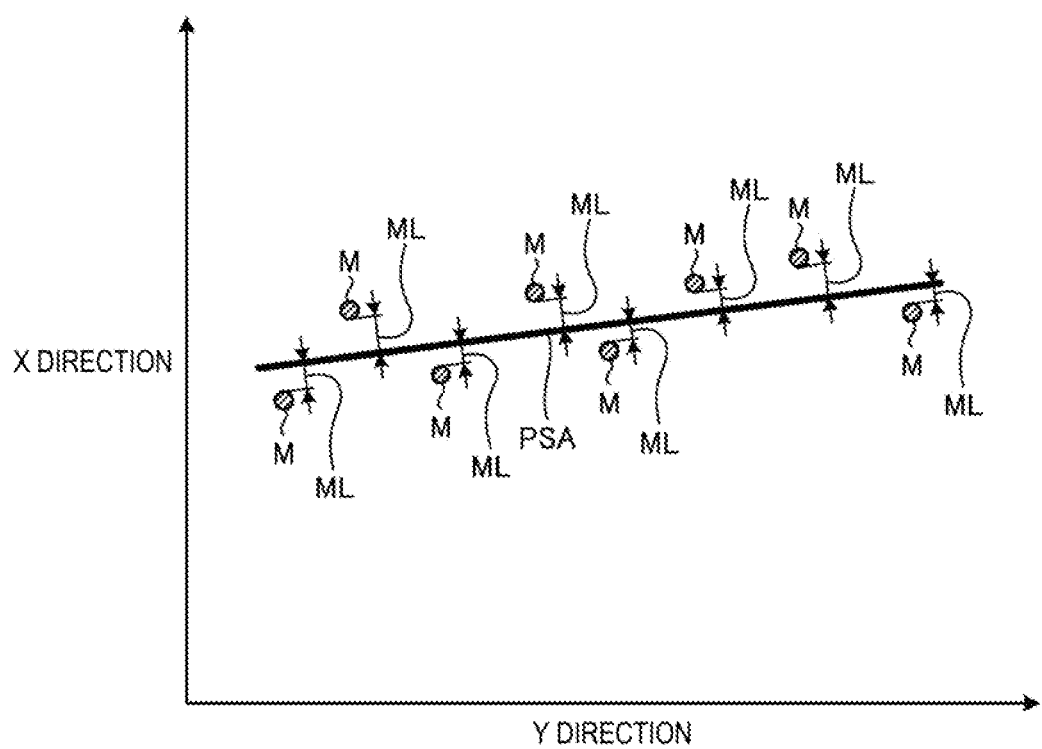
FIG. 11 is a graph for describing an example of the calculation of reliability.

FIG. 11 is a graph for describing an example of calculation of the reliability. The detection control unit 76 may calculate the reliability of the straight line PSA based on the residual of the straight line PSA. The residual refers to the distance between each of the measurement points M and the straight line PSA. The detection control unit 76 preferably sets the reliability to be higher as the residual of the straight line PSA becomes smaller. FIG. 11 illustrates an example of the straight line PSA and the measurement points M. For example, as illustrated in FIG. 11, the detection control unit 76 may calculate, for each of the measurement points M, a distance ML between the measurement point M and the straight line PSA in the two-dimensional coordinate system in the X direction and the Y direction as the residual, and set the reliability to be higher as the total value of the calculated distances ML becomes smaller.

For example, the detection control unit 76 may calculate the reliability of the straight line PSA based on an elapsed time elapsed since the most recent update of the reference position. The elapsed time refers to the time until the detection control unit 76 calculates the position of an obstacle P (straight line PSA) after the last update of the reference position of the same obstacle P using the position of the obstacle P calculated by the detection control unit 76. The detection control unit 76 preferably sets the reliability to be higher as the elapsed time becomes smaller.

Note that the detection control unit 76 calculates the straight line PSA from the point cloud M0 acquired in the recent multiple detections by the sensor 26. That is, the detection control unit 76 calculates the straight line PSA at each detection by the sensor 26. In this case, the detection control unit 76 calculates the reliability for each of the calculated straight lines PSA.

The detection control unit 76 transmits to the information processing device 14 information about the position of an obstacle P having a reliability of a predetermined threshold or more. In this case, the movement information acquisition unit 54 of the information processing device 14 updates the reference position of the obstacle P by setting the position of the obstacle P having a reliability of the predetermined threshold or more, which is identified by the detection control unit 76, to the reference position of the obstacle P. Thus, in the second embodiment, since the reference position of the obstacle P is updated using only highly reliable data, the error between the reference position of the obstacle P and the actual position of the obstacle P can be reduced more preferably.

Note that in the above description, the detection control unit 76 calculates the reliability and transmits to the information processing device 14 information about the position of an obstacle P having a reliability of a predetermined threshold or more, but the present disclosure is not limited to this. For example, the detection control unit 76 may transmit to the information processing device 14, the information of the identified position of the obstacle P in association with the reliability, and the movement information acquisition unit 54 of the information processing device 14 may determine whether the reference position is to be updated at the acquired position of the obstacle P based on the reliability. For example, the movement information acquisition unit 54 of the information processing device 14 may calculate the reliability and determine whether the reference position is to be updated based on the calculated reliability. In these cases, when the reliability is the threshold or more, the movement information acquisition unit 54 may update the reference position with the position of the obstacle P.

Effects of the Present Disclosure

As described above, the movable body 10 according to the present disclosure is a movable body that moves automatically, and includes the plurality of sensors 26 capable of detecting an obstacle P on the periphery, the selection information acquisition unit 74, and the detection control unit 76. The selection information acquisition unit 74 acquires the selection information indicating the sensor 26 to be used for detection of an obstacle P, which is set based on the relationship between the reference position of the obstacle P and the position of the movable body 10. The detection control unit 76 causes the sensor 26 indicated by the selection information to detect the obstacle P, and identifies the position of the obstacle P from the detection result of the obstacle P. The movable body 10 according to the present disclosure selects the sensor 26 used to detect the obstacle P from the positional relationship between the reference position of the obstacle P and the position of the movable body 10. Accordingly, according to the present disclosure, the sensor 26 suitable for detection can be used to appropriately detect the obstacle P.

The selection information is set based on the angle of incidence θ of the light emitted from the sensor 26 to the obstacle P. The angle of incidence θ is calculated based on the relationship between the reference position of the obstacle P and the position of the movable body 10. According to the present disclosure, the sensor 26 is selected based on the angle of incidence θ, thereby suppressing a decrease in the measurement accuracy and appropriately detecting the obstacle P.

In the selection information, the sensor 26 having the largest angle of incidence θ among the plurality of sensors 26 is the sensor 26 to be used. According to the present disclosure, the sensor 26 having the largest angle of incidence θ is selected, thereby suppressing a decrease in the measurement accuracy and appropriately detecting the obstacle P.

The selection information acquisition unit 74 acquires, as the selection information, information indicating the sensor 26 for detecting an obstacle P having a reference position away from the movable body 10 by the predetermined distance LX1 or more. In addition, the detection control unit 76 causes the sensor 26 indicated by the selection information to detect the obstacle P having the reference position away from the movable body 10 by the predetermined distance LX1 or more. When a distant obstacle P located away from the movable body 10 by the predetermined distance LX1 or more is detected, the decrease in the detection accuracy corresponding to the position of the sensor 26 is significant. In contrast, in the present disclosure, since the sensor 26 to be used is selected based on the positional relationship between the reference position of the obstacle P and the position of the movable body 10, a distant obstacle P can be appropriately detected.

The selection information acquisition unit 74 acquires, as the selection information, information indicating the sensor 26 for detecting an obstacle P having a reference position located on a side of the route R and within a predetermined distance range from the route R. Also, the detection control unit 76 causes the sensor 26 indicated by the selection information to detect the obstacle P having the reference position located on the side of the route R and within the predetermined distance range from the route R. In the case where the movable body 10 passes through the narrow path NR with the obstacle P located on a side of the route R of the movable body 10 and near the route R, the risk of interference with the obstacle P becomes more prominent, and the decrease in the detection accuracy depending on the position of the sensor 26 becomes significant. In contrast, in the present disclosure, since the sensor 26 to be used is selected based on the relationship between the reference position of an obstacle P and the position of the movable body 10, an obstacle P located on the side of the narrow path NR can be appropriately detected.

The selection information acquisition unit 74 acquires, as the selection information, first selection information indicating the sensor 26B for detecting the obstacle P1 having a reference position located on one side (the X1 direction side) of the route R, and second selection information indicating the sensor 26A for detecting the obstacle P2 having a reference position located on the other side (the X2 direction side) of the route R. The detection control unit 76 causes the sensor 26B indicated by the first selection information to detect the obstacle P1 having a reference position located on one side of the route R, and causes the sensor 26A indicated by the second selection information to detect the obstacle P2 having a reference position located on the other side of the route R. In the present disclosure, even when obstacles P are present on both sides of the narrow path NR, since the sensor 26 is selected based on the positional relationship between the reference position of the obstacle P and the position of the movable body 10, the obstacle P can be appropriately detected.

The detection control unit 76 identifies the position of the surface PA of the obstacle P on the side facing the route R based on the point cloud M0 acquired by detection of the sensor 26. In the present disclosure, the surface PA of the obstacle P can be appropriately identified by using the point cloud M0.

The detection control unit 76 causes the sensor 26 to detect the obstacle P multiple times, and superimposes the point clouds M0 acquired by detecting the obstacle P multiple times to identify the position of the surface PA of the obstacle P on the side facing the route R. In the present disclosure, the calculation accuracy of the surface PA of the obstacle P can be improved by superimposing the point clouds M0 acquired by the detection.

The movable body 10 further includes the movement information acquisition unit 70 that acquires information of the route R along which the movable body 10 moves, and the movement control unit 72 that causes the movable body 10 to move along the route R. The movement information acquisition unit 70 determines whether the movable body 10 interferes with the obstacle P when the movable body 10 is moved along the route R based on the position of the obstacle P identified by the detection control unit 76. In the present disclosure, it is determined whether the movable body 10 interferes with the obstacle P based on the identified position of the obstacle P, thereby determining the interference with the movable body 10 with high accuracy and appropriately suppressing a collision with the movable body 10.

When it is determined that the movable body interferes with the obstacle P and setting of another route R that does not interfere with the obstacle P is possible, the movement information acquisition unit 70 acquires information about a route R that does not interfere with the obstacle P. Then, the movement control unit 72 moves the movable body 10 along the route R that does not interfere with the obstacle P. According to the present disclosure, a collision with the movable body 10 can be appropriately suppressed by generating a route R that does not interfere with the obstacle P based on the identified position of the obstacle P.

When it is determined that the movable body interferes with the obstacle P and setting of another route R that does not interfere with the obstacle P is not possible, the movement control unit 72 stops the movable body 10. According to the present disclosure, a collision with the movable body 10 can be appropriately suppressed by stopping the movable body when setting of another route R is not possible.

The movement control system 1 according to the present disclosure includes the movable body 10 and the information processing device 14 that transmits and receives information to and from the movable body 10. The movement control system 1 according to the present disclosure can appropriately detect the obstacle P.

The movable body 10 acquires information of the reference position of the obstacle P from the information processing device 14. In addition, the information processing device 14 sets the position of the obstacle P identified by the detection control unit 76 of the movable body 10 as the reference position of the obstacle P to update the reference position of the obstacle P. This can appropriately reduce the error between the reference position of the obstacle P and the actual position of the obstacle P.

The information processing device 14 uses the position of the obstacle P having a reliability in the accuracy of the position of the obstacle P identified by the detection control unit 76 of the movable body 10 of a predetermined threshold or more to update the reference position of the obstacle P. This can more appropriately reduce the error between the reference position of the obstacle P and the actual position of the obstacle P.

In the case where the movable body 10 moving along the preset route R interferes with the obstacle P and setting of another route R that does not interfere with the obstacle P is not possible, the information processing device 14 outputs a command to the movable body 10 or another movable body to move the obstacle P. Since the movable body receiving the command moves the obstacle P causing interference in this manner, the movable body 10 can move toward the target object P0 without any interference.

A control method of the present disclosure is a method for controlling a movable body 10 that moves automatically and that has a plurality of sensors 26 configured to detect an obstacle P on a periphery, and includes a step of acquiring selection information indicating a sensor 26, of the plurality of sensors, to be used for detection of the obstacle P, the sensor being set based on the relationship between the reference position of the obstacle P and the position of the movable body 10, and a step of causing the sensor 26 indicated by the selection information to detect the obstacle P and identifying the position of the obstacle P from a detection result of the obstacle P. This control method allows appropriate detection of the obstacle P.

A program of the present disclosure is a program that causes a computer to execute a method for controlling a movable body 10 that moves automatically and that has a plurality of sensors 26 configured to detect an obstacle P on a periphery. The program causes a computer to execute a step of acquiring selection information indicating the sensor 26 to be used for detection of the obstacle P, the sensor being set based on the relationship between the reference position of the obstacle P and the position of the movable body 10, and a step of causing the sensor 26 indicated by the selection information to detect the obstacle P and identifying the position of the obstacle P from a detection result of the obstacle P. According to the program, it is possible to appropriately detect the obstacle P.

The embodiment of the present invention is described above, but the embodiment is not limited by the details of the embodiment above. Further, the constituent elements of the above-described embodiment include elements that are able to be easily conceived by a person skilled in the art, and elements that are substantially the same, that is, elements of an equivalent scope. Furthermore, the constituent elements described above can be appropriately combined. Further, it is possible to make various omissions, substitutions, and changes to the constituent elements within a range not departing from the scope of the above-described embodiment.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A movable body that moves automatically, comprising:
a plurality of sensors configured to detect an obstacle in a periphery of the movable body;
a selection information acquisition unit configured to acquire selection information indicating a sensor, of the plurality of sensors, to be used for detection of the obstacle, the sensor being set based on a relationship between a reference position of the obstacle and a position of the movable body; and
a detection control unit configured to cause the sensor indicated by the selection information to detect the obstacle, and identify a position of the obstacle from a detection result of the obstacle,
wherein the selection information is set based on an angle of incidence of light emitted from the sensor to the obstacle, the angle of incidence being calculated based on the relationship between the reference position of the obstacle and the position of the movable body,
the movable body further comprising
a movement control unit configured to cause the movable body to move along a route,
wherein when it is determined that the movable body interferes with the obstacle and setting of another route that does not interfere with the obstacle is not possible, the movement control unit stops the movable body.

2. The movable body according to claim 1, wherein in the selection information, a sensor, of the plurality of sensors, having the largest angle of incidence is the sensor to be used.

3. The movable body according to claim 1, wherein
the selection information acquisition unit acquires, as the selection information, information indicating a sensor, of the plurality of sensors, for detecting the obstacle having the reference position away from the movable body by a predetermined distance or more, and
the detection control unit causes the sensor indicated by the selection information to detect the obstacle having the reference position away from the movable body by the predetermined distance or more.

4. The movable body according to claim 1, wherein
the selection information acquisition unit acquires, as the selection information, information indicating a sensor, of the plurality of sensors, for detecting the obstacle having the reference position located on a side of the route of the movable body and within a predetermined distance range from the route, and
the detection control unit causes the sensor indicated by the selection information to detect the obstacle having the reference position located on the side of the route of the movable body and within the predetermined distance range from the route.

5. The movable body according to claim 4, wherein
the selection information acquisition unit acquires, as the selection information, first selection information indicating a sensor, of the plurality of sensors, for detecting the obstacle having the reference position located on a first side of the route and second selection information indicating a sensor, of the plurality of sensors, for detecting another obstacle having the reference position located on a second side of the route, and
the detection control unit causes the sensor indicated by the first selection information to detect the obstacle having the reference position located on the first side of the route and the sensor indicated by the second selection information to detect the obstacle having the reference position located on the second side of the route.

6. The movable body according to claim 4, wherein the detection control unit identifies a position of a surface of the obstacle on a side facing the route based on a point cloud acquired by the detection of the sensor.

7. The movable body according to claim 6, wherein the detection control unit causes the sensor to detect the obstacle multiple times, and superimposes point clouds acquired by the detection performed multiple times to identify the position of the surface of the obstacle on the side facing the route.

8. The movable body according to claim 1, further comprising:
a movement information acquisition unit configured to acquire information of the route along which the movable body moves, wherein
the movement information acquisition unit determines whether the movable body moving along the route interferes with the obstacle based on the position of the obstacle, the position being identified by the detection control unit.

9. The movable body according to claim 8, wherein when it is determined that the movable body interferes with the obstacle and setting of another route that does not interfere with the obstacle is possible, the movement information acquisition unit acquires information of a route that does not interfere with the obstacle, and the movement control unit causes the movable body to move along the route that does not interfere with the obstacle.

10. A movement control system comprising:
the movable body described in claim 1; and
an information processing device configured to transmit and receive information to and from the movable body.

11. The movement control system according to claim 10, wherein
the movable body acquires information about the reference position of the obstacle from the information processing device, and
the information processing device sets the position of the obstacle, the position being identified by the detection control unit of the movable body, as the reference position of the obstacle to update the reference position.

12. The movement control system according to claim 11, wherein the information processing device uses the position of the obstacle having a reliability in accuracy of the position of the obstacle identified by the detection control unit of the movable body of a predetermined threshold or more to update the reference position of the obstacle.

13. The movement control system according to claim 10, wherein, when the movable body moving along a preset route interferes with the obstacle and setting of another route that does not interfere with the obstacle is not possible, the information processing device outputs a command to the movable body or another movable body to move the obstacle.

14. A method for controlling a movable body that moves automatically and that has a plurality of sensors configured to detect an obstacle in a periphery of the movable body, the method comprising steps of:
- acquiring selection information indicating a sensor, of the plurality of sensors, to be used for detection of the obstacle, the sensor being set based on a relationship between a reference position of the obstacle and a position of the movable body; and
- causing the sensor indicated by the selection information to detect the obstacle, and identifying a position of the obstacle from a detection result of the obstacle,
- wherein the selection information is set based on an angle of incidence of light emitted from the sensor to the obstacle, the angle of incidence being calculated based on the relationship between the reference position of the obstacle and the position of the movable body,
- the method further comprising steps of:
- causing the movable body to move along a route,
- wherein when it is determined that the movable body interferes with the obstacle and setting of another route that does not interfere with the obstacle is not possible, stopping the movable body.

15. A non-transitory computer readable medium storing a program for causing a computer to execute a method for controlling a movable body that moves automatically and that has a plurality of sensors configured to detect an obstacle in a periphery of the movable body, the method comprising steps of:
- acquiring selection information indicating a sensor, of the plurality of sensors, to be used for detection of the obstacle, the sensor being set based on a relationship between a reference position of the obstacle and a position of the movable body; and
- causing the sensor indicated by the selection information to detect the obstacle, and identifying a position of the obstacle from a detection result of the obstacle,
- wherein the selection information is set based on an angle of incidence of light emitted from the sensor to the obstacle, the angle of incidence being calculated based on the relationship between the reference position of the obstacle and the position of the movable body,
- the method further comprising steps of:
- causing the movable body to move along a route,
- wherein when it is determined that the movable body interferes with the obstacle and setting of another route that does not interfere with the obstacle is not possible, stopping the movable body.

* * * * *